Inventors
Werner K. Priese
David J. Davies
By: Olson, Trexler, Wolters & Bushnell attys.

Nov. 25, 1969  W. K. PRIESE ET AL  3,480,253
BALL VALVE WITH SEATS FOR JOURNALLED BALL
Filed Dec. 28, 1967  2 Sheets-Sheet 2
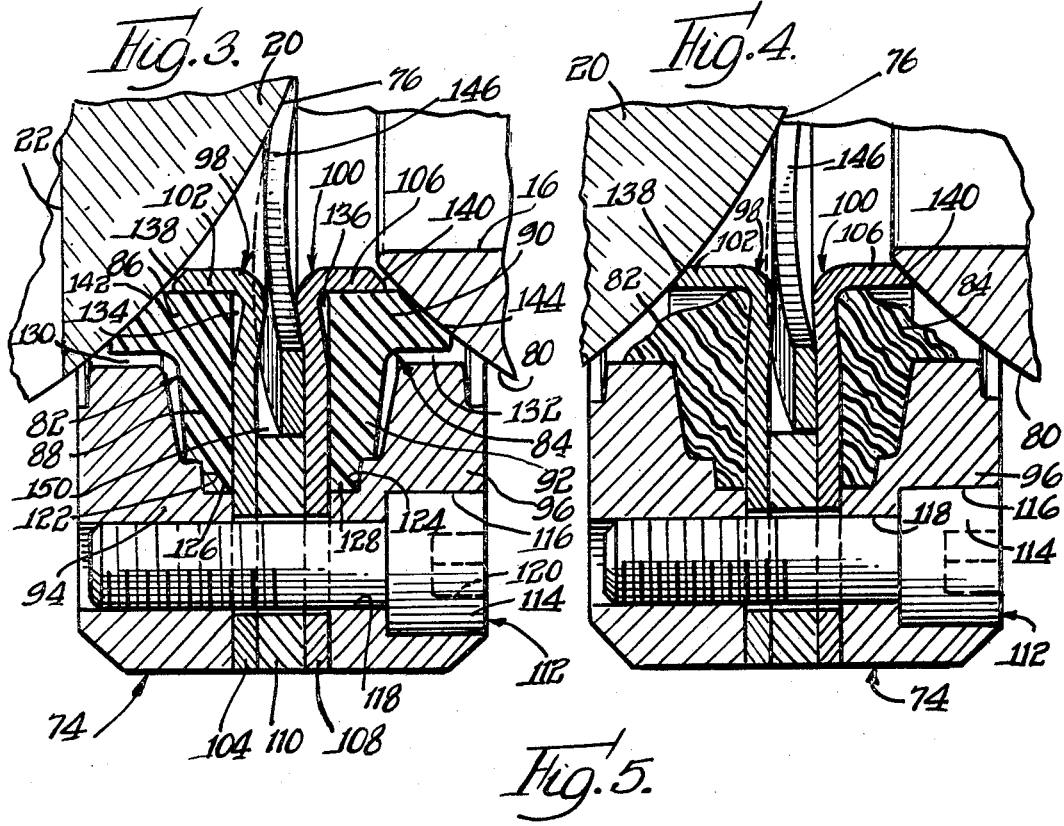
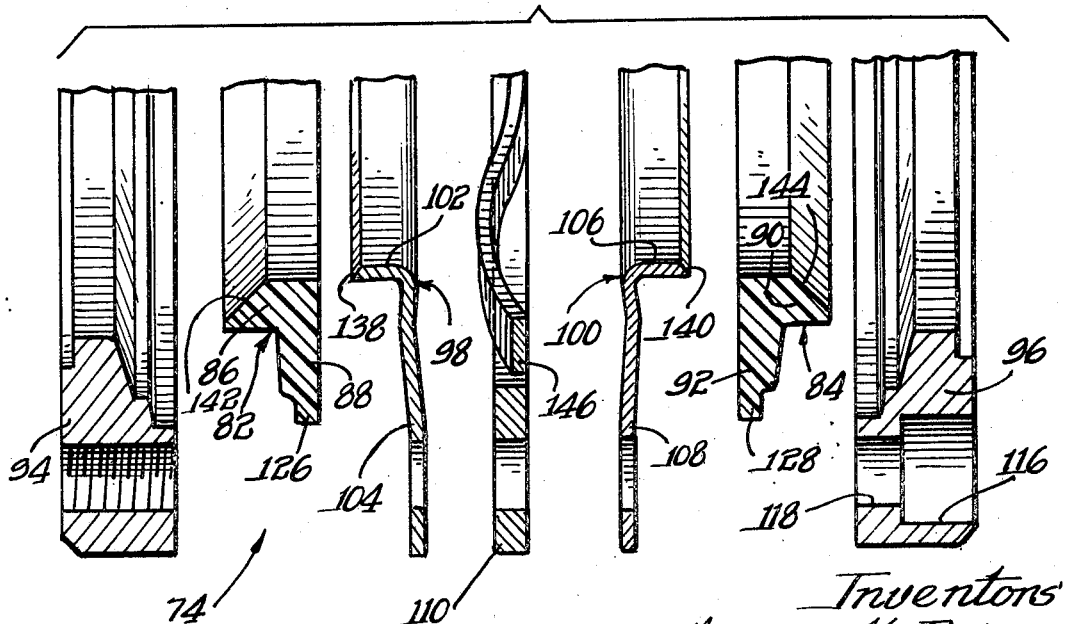
Inventors
Werner K. Priese
David J. Davies
By: Olson, Trexler, Wolters & Bushnell attys.

United States Patent Office 3,480,253
Patented Nov. 25, 1969

3,480,253
BALL VALVE WITH SEATS FOR
JOURNALLED BALL
Werner K. Priese, Barrington, and David J. Davies, Naperville, Ill., assignors to Hills-MacCanna Company, Carpentersville, Ill., a corporation of Delaware
Filed Dec. 28, 1967, Ser. No. 694,273
Int. Cl. F16k 25/02, 15/04, 5/06
U.S. Cl. 251—174                               6 Claims

ABSTRACT OF THE DISCLOSURE

A ball valve in which a journalled ball is sealed to the valve body by a composite valve seat having replaceable seat seals formed of yieldable polymeric material that cantilever inwardly in spaced relation to each other and are initially urged into sealing engagement with the ball and a seat support surface on the body by inwardly cantilevering annular springs which also serve, in the event of destruction of the seat seals by the excessive heat of a fire, to establish an emergency seal between the ball and valve body. The seat sealing pressure is further increased by fluid pressure between the seat seals and by a wavy spring disposed between the inwardly cantilevering annular springs. The sealing effectiveness of the seat is undiminished by displacement of the ball incident to tightening of the valve stem seal. The seat support surface is defined by a body insert adapted to be readily removed for cleaning and replacement if necessary.

---

This invention relates to ball valves in which the ball is journalled on the valve body.

The matter of sealing a valve of this type against the passage of fluid through the valve is complicated by the fact that the differential force of fluid pressure on the valve ball is not available for forming a seal between the ball and valve body. A challenging problem in the construction of valves of this type is to provide, when the valve is closed, sufficient sealing pressure to preclude the leakage of fluid through the valve in a manner which avoids the application of excessive sealing pressure to the ball when the valve is not fully closed and which avoids excessive resistance to turning of the valve ball between its open valve and closed valve positions.

Effective sealing of such a valve when closed is further complicated in valves that are so designed that the valve ball is displaced as an incident to tightening of a seal around an operating stem integral with the ball, a structural feature which, in itself, is advantageous.

It is widely apperciated that valve seat seals formed of yieldable polymeric materials can be used to distinct advantage in valves of this type. However, use of such yieldable polymeric seat seals is a source of service problems incident to protracted wear of such seals. It is also a source of difficulty in blocking fluid flow through such a valve in the event the yieldable polymeric seals are caused to collapse by excessive temperatures due to exposure of the valve to the heat of a fire, for example.

One object of the invention is to provide a new and improved ball valve having a journalled ball that is sealed to the valve body, when the valve body is closed, by new and highly advantageous valve seats.

A further object is to provide an improved ball valve of the character recited in the preceding object in which each valve seat has a new and highly advntageous composite construction which utilizes annular seat seals of yieldable polymeric material to adavntage in establishing between the valve body and valve ball, when the valve is closed, a highly effective initial seal that is progressively increased in its effectiveness by differential fluid pressure tending to force fluid through the closed valve.

A further object is to provide in an improved ball valve of the character recited in the preceding object an improved valve seat which utilizes a new and highly advantageous arrangement of springs to support yieldable polymeric valve seat seals and to produce between the valve seat and the valve ball and between the valve seat and a seat support surface on the valve body residual sealing pressures that are sufficient to assure effective initial sealing of the valve when it is closed while providing for reasonable easy turning of the ball between its open and closed valve positions without excessive wear on the yieldable polymeric seat seals.

Another object is to provide a ball valve as recited in the preceding object which functions when closed even when exposed to excessive temperatures sufficient to cause deterioration of the normally effective seat seals to maintain a reasonably effective emergency seal between the valve ball and valve body.

Another object is to provide in a ball valve of the character recited a composite valve seat which is readily adapted to be disassembled and reassembled to restore the valve seat to a new condition, after completion of its normal service life, by the simple expedient of replacing two yieldable polymeric seat seals incorporated in the seat.

A further object is to provide a ball valve of the character recited having a new and improved construction which permits quick and easy removal of all sealing surfaces from the valve body for easy cleaning and replacement as may be required.

Other objects and advantages will become apparent from the following description of the exemplary embodiment of the invention illustrated in the drawings, in which:

FIG. 3 is a fragmentary sectional view on an enlarged scale taken along the line 3—3 of FIG. 1 and illustrating one valve seat in radial section as engaged with adjacent portions of the valve ball and coacting seat support;

FIG. 4 is a view similar to FIG. 3 but illustrating the action of the valve seat to form an emergency seal between the valve ball and valve body in the event of overheating of the yieldable polymeric seat seals; and FIG. 5 is an exploded radial sectional view on an enlarged scale of a composite seat used in the valve.

Figure 1:
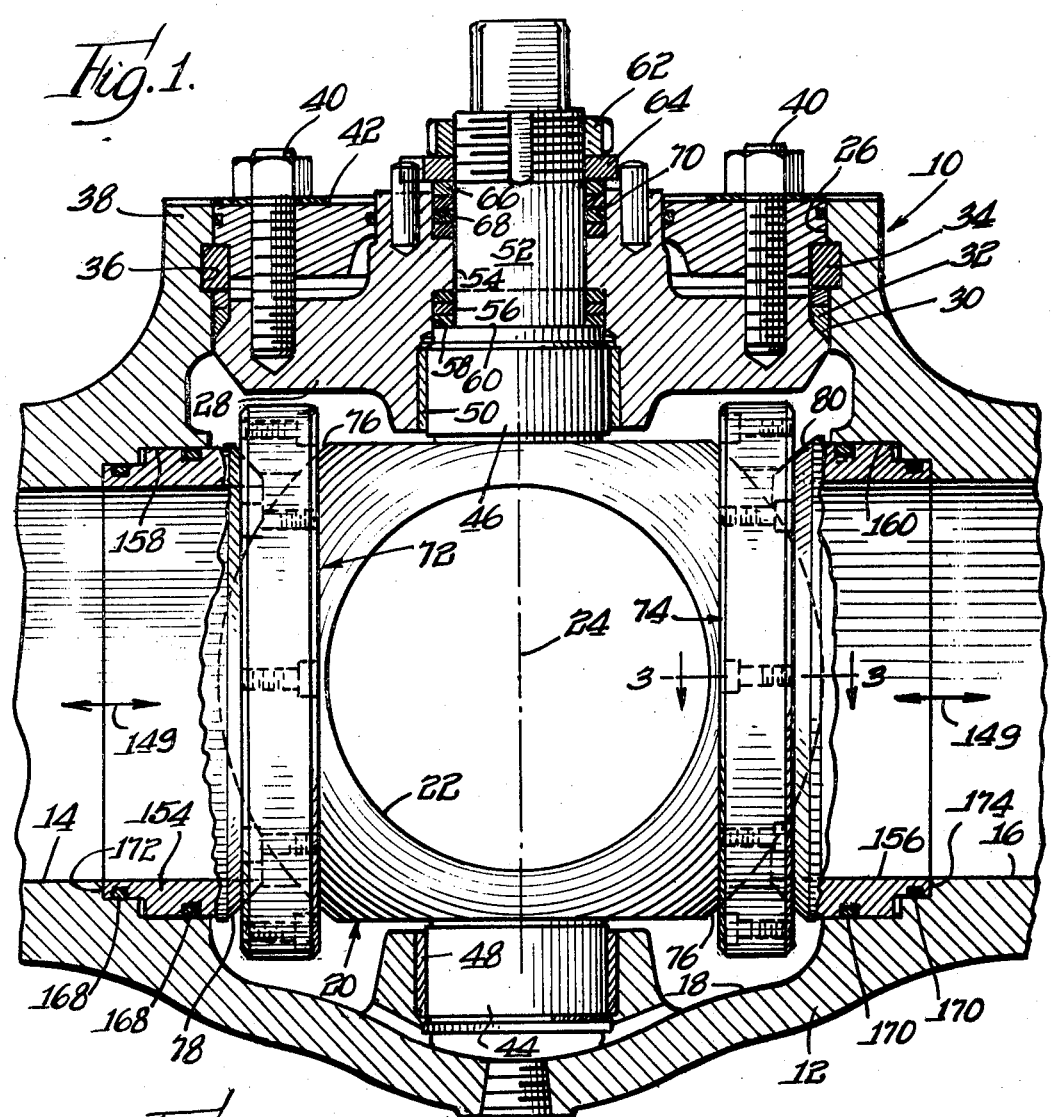
FIG. 1 is a longitudinal sectional view of the valve forming the exemplary embodiment of the invention illustrated.

Referring to the drawings in greater detail, the ball valve 10 forming the exemplary embodiment of the invention illustrated comprises a valve body 12 defining two flow passages 14, 16 opening into opposite sides of a valve chamber 18 containing a rotary flow control ball 20 defining an internal flow passage 22 that is turned into and out of alignment with the passages 14, 16 to open and close the valve upon turning of the ball 20 about its axis of rotation 24.

The ball 20 is assembled into the valve chamber 18 and subsequently removed from the valve chamber for servicing, if required, through a circular access opening 26 formed in one lateral side of the valve body 12, between the passages 14, 16, and opening into the valve chamber 18 as shown. The opening 26 is normally closed by a circular bonnet 28 that fits down into the opening 26, as shown, where it is held against outward displacement by parts that are subjected essentially to compressive and shear loads. More particularly, a cam surface 30 of truncated conical shape formed on the valve bonnet adjacent its periphery engages a sealing ring 32 which is held against axially outward displacement by a radially expandable anchor ring 34 removably fitted in an anchor groove 36 formed in the circular portion 38 of the body 12 that defines the bonnet opening 26, as shown.

Initial tightening of the seal 32 is effected preferably by an annular series of threaded tension elements 40 anchored in the bonnet 28 and reacting on an annular abutment ring 42 that encircles the bonnet in abutting relation to the outer side of the anchor ring 34, as shown.

The bonnet 28 may be thought of as being a removable part of the body 12.

The ball 20 is journalled for rotation about the axis 24 by two trunnions 44, 46 integral with the ball and projecting in opposite directions in coaxial relation to the axis 24 into two coaxial trunnion bearings 48, 50. The trunnion bearing 50 is supported in the inner side of the bonnet 28 in coaxial relation to the circular bonnet as shown.

A control stem 52 for rotating the ball 20 is formed integrally with the trunnion 46 in coaxial relation to the latter and extends outwardly through a stem bore 54 in the bonnet 28.

A highly effective seal between the control stem 52 and the bonnet 28 is formed by an inner annular seal 56 of yieldable sealing material fitted into a counterbore 58 in the inner end of the stem bore 54 in encircling relation to the control stem. Materials suitable for forming the yieldable inner seal 56 are known to those skilled in the art and include, for example, yieldable polymeric materials, such for instance, as polytetrafluoroethylene, sold commercially under the trademark "Teflon," or reinforced Teflon which is also readily available commercially.

The yieldable seal 56 is compressively urged axially against the bottom of the counterbore 58 by an annular shoulder 60 on the stem 52. Axially outward force is applied through the stem 52 to the shoulder or seal compressor 60 by an outer seal tightening nut 62 threaded onto the stem 52 and acting inwardly through a motion limiting plate 64 and an axially movable gland 66 on a yieldable outer seal 68 generally similar to the inner seal 56 and disposed in an outer counter bore 70 in the stem bore 54 in encircling relation to the stem 52, as shown.

Tightening of the nut 62 effects tightening of the inner and outer seals 56, 58 simultaneously. It should be noted in this connection that axially outward displacement of the control stem 52 as an incident to initial tightening and subsequent retightening of the inner seal 56 effects a displacement of the ball 20 along the axis of rotation 24 of the ball in relation to the inner ends of the passages 14, 16 opening into the valve chamber 18.

When the valve is closed as illustrated in FIG. 1, the ball 20 is sealed to the valve body 12 by two annular seats 72, 74 each having a composite construction to be described. The two seats 72, 74 have slidable sealing engagement with the spherically curved external surface 76 of the valve ball 20 and are supported respectively by two annular surfaces 78, 80 encircling the inner ends of the passages 14, 16. The seat support surfaces 78, 80 are each inwardly convex and each has the form of an annular segment of a spherical surface having a radius of curvature equal to that of the spherically curved external ball surface 76.

As illustrated, the two composite seats 72, 74 are identical in construction. The seat 74, for example, FIGS. 1, 3, 4 and 5, comprises two annular seat seals 82, 84 which continuously engage respectively the external ball surface 76 and the adjacent seat support surfaces 80. Each of the seat seals 82, 84 is formed of a yieldable polymeric material such, for example, as polytetrafluoroethylene, sold commercially under the trademark "Teflon," reinforced polytetrafluoroethylene, nylon, reinforced nylon, and polytrifluoromonochloroethylene, sold commercially under the trademark "Kel-F."

The seat seals 82, 84 of the seat 74 are shaped substantially as mirror images of each other. The annular seal 82, for example, comprises a generally cylindrical sealing leg 86 and a generally flat support leg 88 integrally joined to the inner marginal edge of the sealing leg 86 and extending radially outward so that the seal 82 has a generally L-shape, as viewed in radial section, FIGS. 3 and 5.

Similarly, the annular seat seal 84 has a generally cylindrical sealing leg 90 and a generally flat support leg 92, the two annular seals 82, 84 being turned in relation to each other so that the sealing legs 86, 90 project axially away from each other.

The outer peripheries of the support legs 88, 92 of the respective seals 82, 84 are clamped between two base ring elements 94, 96 and two annular seat seal support springs 98, 100.

The seal support springs 98, 100, like the annular seals 82, 84, are generally L-shaped as viewed in radial section. The springs 98, 100 are also formed substantially as mirror images of each other, the spring 98 having a generally cylindrical and relatively short inner leg 102 integrally joined to its inner edge with a generally flat and relatively long radial leg 104 extending radially outward from the inner leg 102, as shown in FIG. 3. Similarly, the generally L-shaped spring 100 has a generally cylindrical inner leg 106 integrally joined with the inner periphery of a generally flat radial leg 108.

The outer portions of the radial legs 104, 108 of the springs 98, 100 are positively separated by a flat spacer ring 110 intervening directly between the spring legs 104, 108 and extending from the outer peripheries of the spring legs 104, 108 radially inward for a radial distance which, as shown, is only slightly greater than one-half the radial width of the spring legs 104, 108.

The two annular base ring elements 94, 96 embrace the outer marginal edges of the radial spring legs 104, 108, as shown in FIG. 3, and are firmly clamped against the spring legs by an annular series of threaded elements 112. Preferably, each threaded element 112 is formed by a cap screw, also denoted by the number 112, extending axially through one of the base ring elements, the element 98 in FIG. 3, and passing through the spring legs 104, 108 and intervening spacer ring 110 into threaded engagement with the other base ring element 94, as shown in FIG. 3. The enlarged head 114 of the cap screw 112 is accompodated in a counterbore 116 in the base ring bore 118 that receives the head end of the cap screw.

Preferably, the ends of alternate cap screws 112 are turned axially in opposite directions so that half of the screws are threadedly anchored into each of the base ring elements 94, 96. The head of each cap screw 112 is preferably socketed as indicated by the number 120 for receipt of an Allen wrench (not shown) used for tightening and subsequent untightening of the screw.

Somewhat inwardly of the threaded elements 112, the base ring elements 94, 96 are recessed at 122, 124 respectively to receive the axially thinned outer marginal edges 126, 128 of the support leg portions of the respective seals 82, 84 and clamp the latter against adjacent portions of the radial spring legs 104, 108 which are positively spaced apart by the inner marginal edge of the spacer ring 110, as shown in FIG. 3.

From the axially clamped outer marginal edges 126, 128 of the seal support legs 88, 92, the base rings 94, 96 extend radially inward in axially spaced relation to the respective seal legs 88, 92 and stop somewhat radially short of the sealing legs 86, 90 of the seals 82, 84 to define between the inwardly extending portions of the base rings and the respective seals two annular spaces 130, 132 that are also generally L-shaped in radial section and relatively thin in radial section in realtion to the corresponding thickness of the respective seals 82, 84.

The L-shaped annular spaces 130, 132 function to allow dynamic action of the seat seals 82, 84 while the base ring elements 94, 96 extend into sufficienitly close proximity to the seat seals 82, 84 to assure that the latter are not under any circumstances, forced out of their effective operating positions in the composite valve seat 74.

Dynamic action of the seals 82, 84 in establishing and maintaining effective seals with the ball surface 76 and support surface 80 is further facilitated by shaping the inner marginal edges of the radial legs 104, 108 of the seal support springs 98, 100 so that they angle somewhat toward each other in reaching junctures with the inner spring legs 102, 106, respectively, thus providing initially axially thin annular spaces 134, 136 between the inner edges of the seal legs 86, 90 and the respective springs 98, 100.

The sealing legs 86, 90 are dimensioned axially to extend somewhat beyond the inner spring legs 102, 106 to slidably engage and seal against the adjacent ball surface 76 and seat support surface 80, respectively, while the axially outer edges 138, 140 of the inner spring legs 102, 106 are held substantial distances away from the respective surfaces 76, 80 by the longer structure of the sealing legs 86, 90 intervening between and loaded in compression between the ball surface 76 and support surface 80 and the respective springs 98, 100.

The axially outer surfaces 142, 144 of the respective sealing legs 86, 90 are shaped similarly to adjacent portions of the ball surface 76 and support surface 80 to fit sealably against the latter respectively.

As shown, the inner legs 102, 106 of the respective springs 98, 100 closely encircle the sealing legs 86, 90 of the respective seals 82, 84 so that radially inward displacement of the inner peripheries of the respective seals 82, 84 is effectively precluded by the seal retaining action of the inner spring legs 102, 106.

As previously indicated, the resilient springs 98, 100, which are formed preferably of stainless steel, cantilever radially inward from the spacer ring 110 and yieldably support the inwardly extending seat seals 82, 84 against the sealing forces applied by the surfaces 76, 80 to the outer surfaces 142, 144 of the respective seals and tending to move the seals axially toward each other.

An annular thrust spring 146 of wavy configuration interposed between the inwardly cantilevering springs 98, 100 acts simultaneously on both springs 98, 100 to urge the latter yieldably away from each other and in this manner provides additional resilient support to the seat seals 82, 84 against the sealing forces tending to urge the seat seals toward each other.

As viewed another way, the inwardly cantilevering springs 98, 100 together with the supplementary resilient force provided by the wavy spring 146 urges the two seals 82, 84 into effective sealing engagement with the ball surface 76 and support surface 80.

As previously indicated, the construction of the valve seat 72 in the valve illustrated is essentially identical to that of the valve seat 74, the valve seat 72 operating to form seals with the seat support surface 78 and the ball surface 76, respectively.

The positional relationship of the seat support surfaces 78, 80 in relation to the exterior ball surface 76 is such that upon assembly of the valve components, the ball surface 76 and the seat support surface 80, for example, operate against the seat seals 82, 84 forcing the latter axially toward each other against the resilient support provided by the springs 98, 100 and the spring 146 sufficiently to produce a residual sealing pressure engagement of the seals 82, 84 against the ball surface 76 and seat support surface 80 that assures effective initial sealing of a valve when the ball is turned to its closed valve position. When the closed valve blocks differential fluid pressure tending to force fluid through the valve, the relatively high pressure on the upstream side of the valve enters the space intervening between the seat seals of the upstream valve seat. Flow through the valve can be in either direction, as indicated in FIG. 1 by the double ended arrows 149, depending upon which of the passages 14, 16 contains the higher fluid pressure.

Assuming the higher pressure exists in the passage 16, the high pressure fluid enters the space 150 between the inwardly cantilevering springs 98, 100 to add powerful forces of fluid pressure to the spring forces operating to urge the seat seals 82, 84 into effective sealing engagement with the ball surface 76 and seat support surface 80 with the result that the tightness and hence effectiveness of the seat seal increases progressively with the differential fluid pressure on the ball to provide effective assurance against leakage through the valve even when it is closed against high differential fluid pressure.

In this connection, it should be noted that during the major portion of the angular movement of the ball 20 between its closed valve and its open valve positions, the fluid pressure forces tending to increase the seat sealing pressures are released wholly or in part due to the passage of fluid through the ball bore 22 which begins as soon as the ball bore is turned into partial alignment with the passages 14, 16 in the course of rotary movement of the ball 20.

In the event the closed valve is excessively overheated by exposure to the heat of a fire, for example, to the extent that the yieldable polymeric seals 82, 84 in the typical seat 74 collapse, an effective emergency seal against the flow of fluid through the valve is established by the springs 98, 100 of the typical seat 74 which are freed by the thermal collapse of the seat seals 82, 84 to swing the inner spring legs 102, 106 into engagement with the external ball surface 76 and the seat support surface 80 is illustrated in FIG. 4. Preferably, the spring edges 138, 140 are shaped, as illustrated in FIGS. 3 and 4, to conform to and sealably fit against the ball surface 76 and seat support surface 80 in the event of thermal collapse of the seals 82, 84.

The valve thus described maintains its full sealing effectiveness over a long service life. Retightening of the previously described stem seals is effected essentially by turning of the single tightening nut 62. Displacement of the ball 20 along its axis of rotation 24 as an incident to movement of the ball to tighten the inner stem seal 56 does not diminish the sealing effectiveness of the seats 72, 74. In this instance, the seat seals 82, 84 of the seat 74, for example, move either toward or away from each other, by virtue of the resilient spring support for the two seals, as necessary to accommodate the change in spacing of the ball surface 76 from the seat support surface 80 incident to the ball displacement.

In the event overhaul of the valve after long service becomes desirable or necessary, restoration of the valve to its new condition is easy and inexpensive to accomplish. The ball and seats are removed through the bonnet opening 26 from which the bonnet 28 is removed. The seat 74, for example, is inexpensively restored to its new condition by replacement of the two seat seals 82, 84. Disassembly of the composite seat 74 for this purpose is readily effected by removal of the threaded elements 112. Reassembly of the seat with new seals is effected in an eqally simple manner.

Figure 2:
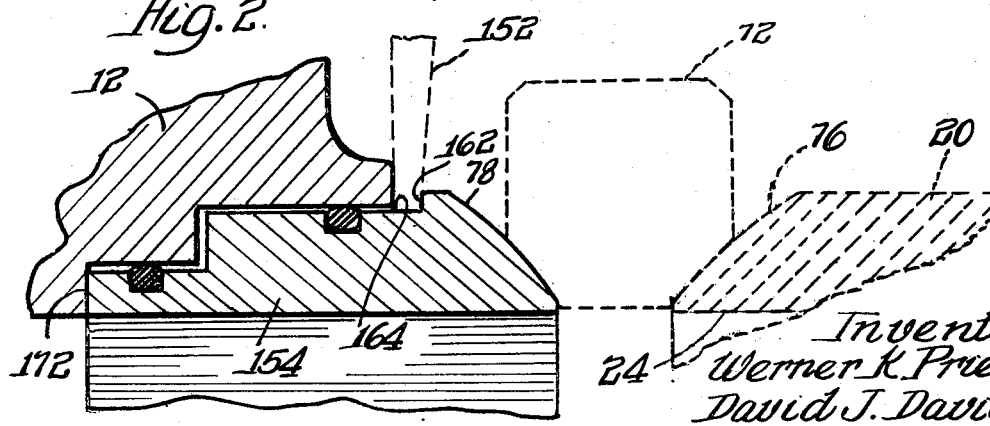
FIG. 2 is a fragmentary sectional view on an enlarged scale illustrating the use of a simple tool to remove from the valve body cylindrical insert which defines a support surface for a coacting valve seat engaging the valve ball, adjacent fragmentary portions of the seat and ball being illustrated in phantom.

Any desired cleaning or replacement of the seat support surfaces 78, 80 is readily accomplished, as indicated in FIG. 2, by use of a simple tool 152 to remove two cylindrical valve body inserts 154, 156 which are assembled into stepped counterbores 158, 160 in the respective passages 14, 16. The inner ends of the inserts 154, 156 project somewhat into the chamber 18 and are finished to define the respective seat support surfaces 78, 80. A radial annular shoulder 162 former on the insert 154 is normally positioned a short distance axially from the encircling portion of the valve body 12, as shown in FIG. 2, to define therebetween an annular groove 164 into which the tool 152 is inserted to displace the insert 154 axially inward for removal through the chamber 18 and bonnet opening 26. The insert 156 is similar in construction to the insert 154 and is removed in the same way.

The removed inserts 154, 156 can be easily cleaned or replaced with new inserts. When assembled into the valve to form a component of the valve body 12, the insert 154 is sealed to the encircling body structure by two O-ring seals 168. Similar seals 170 seal the insert 156 to the encircling body structure.

Since the inserts 154, 156 are movable axially within the respective counterbores 158, 160, the insert disposed on the upstream side of the ball 20 when the valve is closed is dynamically urged against the upstream valve seat by the force of fluid pressure on the upstream insert. Assuming, as before, that the higher fluid pressure exists in the passage 14 when the valve is closed, high fluid from the passage 14 enters the annular interface 172 between the bottom of the counterbore 158 and the outer end of the insert 154 where it acts on the insert 154 to urge he latter against the adjacent valve seat 72, which reacts dynamically as previously described against the seat support surface 78 on the inner end of the insert 154. Similarly, the insert 156, when disposed on the upstream side of the valve, is urged against the seat 74 by fluid under pressure from the passage 16 entering the annular interface 174 between the outer end of the insert 156 and the bottom of the counterbore 160.

The invention is claimed as follows:

1. A ball valve comprising, in combination, a body defining an internal valve chamber and two flow passages opening into said chamber, said body defining counterbores in the inner ends of said respective flow passages, two centrally open body inserts of annular form removably fitted in said counterbores in the inner ends of said respective flow passages for removal from the counterbores in an inward direction for service and subsequent replacement, sealing means forming an annular seal between each of the body inserts and said body, each body insert defining on the inner end thereof an annular seat support surface encircling the inner end of the corresponding flow passage and having in radial section an inwardly convex shape, a centrally bored flow control ball rotatably disposed within said chamber, two annular valve seats slidably supported on said seat support surfaces of said respective inserts and slidably engaging said ball; each valve seat comprising an annular spacer ring, two annular seal support springs generally L-shaped in radial section individually and having respectively radial legs overlapping opposite sides of said spacer ring and projecting inwardly therefrom in spaced relation to each other, said springs having generally cylindrical inner legs joined to the inner peripheries of the radial legs of the respective springs and projecting axially in opposite directions, the axially outer edges of said inner spring legs being shaped to fit sealably against said ball and the adjacent seat support surface respectively, two annular seals each formed largely of yieldable polymeric material and disposed on the outward sides of said respective springs, said seals individually being generally L-shaped in radial section and having respectively inner sealing legs of generally cylindrical form disposed on the radially outward sides of the corresponding inner spring legs and projecting axially therebeyond to sealably engage said ball and the adjacent seat support surface respectively and to react on said springs normally to hold said inner spring legs away from said ball and the adjacent seat support surface, each seal having a support leg extending from the axially inward portion of the seal sealing leg radially outward in overlapping relation to the radial leg of the adjacent spring, two base rings clamping the outer marginal edges of said respective seal support legs to said respective springs and projecting radially inward in overlapping spaced relation to said respective seals, a plurality of threaded connecting elements extending through said spacer ring and the outer marginal edges of said springs in mutually connecting relation to said base rings, and an annular thrust spring of wavy form disposed between the inwardly projecting portions of said seal support springs to urge the latter axially away from each other; said seal support springs of each seat being dimensioned and positioned in relation to said ball and the adjacent seat support surface to effect sealing engagement of the axially outer edges of the inner spring legs of the seat with said ball and the adjacent seat support surface respectively in the event of excessive heating of the valve causing collapse of the yieldable polymeric seals of the seat.

2. A ball valve comprising, in combination, a body defining an internal valve chamber and two flow passages opening into said chamber, said body defining two annular seat support surfaces encircling the inner ends of said respective passages, a flow control ball rotatably disposed within said chamber, two annular valve seats slidably supported on said respective seat support surfaces and slidably engaging said ball; each valve seat comprising an annular spacer ring, two annular springs generally L-shaped in radial section individually and having respectively radial legs overlapping opposite sides of said spacer ring and projecting inwardly therefrom in spaced relation to each other, said springs having generally cylindrical inner legs joined to the inner peripheries of the radial legs of the respective springs and projecting axially in opposite directions, the axially outer edges of said inner spring legs being shaped to fit sealably against said ball and the adjacent seat support surface respectively, two annular seals each formed largely of yieldable polymeric material and disposed on the outward sides of said respective springs, said seals individually being generally L-shaped in radial section, said seals having inner sealing legs disposed on the radially outward sides of the adjacent inner spring legs and projecting axially therebeyond to sealably engage said ball and the adjacent seat support surface respectively and to react on said springs normally to hold the inner legs thereof out of engagement with said ball and the adjacent seat support surface, said seals having support legs extending radially outward in overlapping relation to the radial legs of the respective springs, two base rings clamping the outer marginal edges of said respective seal support legs to said respective springs and projecting radially inward in overlapping spaced relation to said respective seals, a plurality of threaded connecting elements extending through said spacer ring and the outer marginal edges of said springs in mutually connecting relation to said base rings; said annular springs of each seat being dimensioned and positioned in relation to said ball and the adjacent seat support surface to effect sealing engagement of the projecting edges of the inner spring legs of each seat against said ball and the adjacent seat support surface respectively in the event of excessive heating of the valve causing collapse of the yieldable polymeric seals of the seat.

3. A ball valve comprising, in combination, a body defining an internal valve chamber and two flow passages opening into said chamber, said body defining annular seat support surfaces encircling the inner ends of said respective flow passages, a flow control ball rotatably disposed within said chamber, two annular valve seats supported on said respective seat support surfaces and slidably engaging said ball; each valve seat comprising an annular spacer ring, two annular seal support springs overlapping opposite sides of said spacer ring and projecting inwardly therefrom in spaced relation to each other, said springs having inner marginal edges projecting axially in opposite directions, two annular seals each formed largely of yieldable polymeric material and disposed on the outward sides of said respective springs, said seals having respectively inner sealing portions projecting axially beyond said inner marginal edges of the respective springs to sealably engage said ball and the adjacent seat support surface respectively and to react on said springs normally to hold the inner edges of the springs away from said ball and the adjacent seat support surface, each seal extending radially outward in overlapping relation to the adjacent spring, and means clamping said seals to said springs and clamping said springs to said spacer ring; said springs of each seat being dimensioned and positioned in relation to said ball and the adjacent seat support surface to effect sealing engagement of the inner edges of the springs of the seat with said ball and the adjacent seat support surface respectively in the event of excessive heating of the valve causing collapse of the yieldable polymeric seals of the seat.

4. A ball valve comprising, in combination, a body defining an internal valve chamber and two flow passages opening into said chamber, said body defining annular seat support surfaces encircling the inner ends of said respective flow passages, a flow control ball rotatably disposed within said chamber, two annular valve seats supported on said respective seat support surfaces and slidably engaging said ball; each valve seat comprising two annular seal support springs having outer marginal edges secured to each other, said springs having inward annular portions projecting inward in axially spaced relation to each other, two annular seals each formed largely of yieldable polymeric material and disposed on the outward sides of said respective springs, said seals having respectively inner sealing portions projecting axially in opposite directions beyond said respective springs to sealably engage said ball and the adjacent seat support surface respectively and to react axially inward against said inwardly projecting annular portions of said respective springs, each seal extending radially outward in overlapping relation to the adjacent spring, and means clamping together said seals and said springs.

5. For forming a slidable seal between a valve ball and a seat support surface, a ball valve seat comprising, in combination, an annular spacer ring, two annular seal support springs generally L-shaped in radial section individually and having respectively radial legs overlapping opposite sides of said spacer ring and projecting inwardly therefrom in spaced relation to each other, said seal support springs having generally cylindrical inner legs joined to the inner peripheries of the radial legs of the respective springs and projecting axially in opposite directions, two annular seals each formed largely of yieldable polymeric material and disposed on the outward sides of said respective springs, said seals individually being generally L-shaped in radial section, each seal having an inner sealing leg of generally cylindrical form disposed on the radially outward side of the adjacent inner spring leg and projecting axially therebeyond, each seal having a support leg extending from the axially inward portion of the seal sealing leg radially outward in overlapping relation to the radial leg of the adjacent spring, two base rings clamping the outer marginal edges of said respective seal support legs to said respective springs and projecting radially inward in overlapping spaced relation to said respective seals; a plurality of threaded connecting elements extending through said spacer ring and the outer marginal edges of said springs in mutually connecting relation to said base rings to releasably hold together said base rings, seals, springs and spacer ring; and an annular thrust spring of wavy form disposed between the inwardly projecting portions of said annular springs to urge the latter axially away from each other.

6. For forming a slidable seal between a valve ball and a seat support surface, a ball valve seat comprising, in combination, an annular spacer ring, two annular seal support springs generally L-shaped in radial section individually and having respectively radial legs overlapping opposite sides of said spacer ring and projecting inwardly therefrom in spaced relation to each other, said seal support springs having generally cylindrical inner legs joined to the inner peripheries of the radial legs of the respective springs and projecting axially in opposite directions, two annular seals each formed largely of yieldable polymeric material and disposed on the outward sides of said respective springs, each seal having an inner annular sealing portion disposed on the radially outward side of the adjacent inner spring leg and projecting axially therebeyond, each seal having a support leg extending from the sealing portion of the seal radially outward in overlapping relation to the radial leg of the adjacent spring, two base rings clamping the outer marginal edges of said respective seal support legs to said respective springs; and releasable means connecting said base rings to releasably hold together said base rings, seals, springs and spacer ring.

References Cited

UNITED STATES PATENTS

| | | | |
|---|---|---|---|
| 2,326,489 | 8/1943 | Payne | 277—86 |
| 2,772,848 | 12/1956 | Holzer | 251—174 X |
| 3,011,757 | 12/1961 | Miller | 251—172 |
| 3,132,837 | 5/1964 | Britton | 251—315 X |
| 3,401,914 | 9/1968 | Shand | 251—315 X |
| 3,414,233 | 12/1968 | Priese | 251—174 X |

CLARENCE R. GORDON, Primary Examiner

U.S. Cl. X.R.

251—315